United States Patent Office 3,102,883
Patented Sept. 3, 1963

3,102,883
MORPHOLINE ACETIC ACID ESTER OF CHLORAMPHENICOL
Francesco Lauria and Antonio De Franceschi, Milan, Italy, assignors to Carlo Erba S.p.A., Milan, Italy, a firm
No Drawing. Filed Apr. 22, 1958, Ser. No. 730,060
Claims priority, application Italy Nov. 7, 1957
1 Claim. (Cl. 260—247.2)

Chloramphenicol, the antibiotic whose therapeutic activity has been known for some time, possesses the inconvenient property of slight solubility in water, so that it is impossible to prepare aqueous solutions for parenteral use at concentrations such as to give useful blood levels.

In order to overcome this difficulty, hemi-esters with dicarboxylic acids (e.g.: succinic, phthalic, etc.) have been synthesized for some time now and these give salts with alkaline metals (Na, K) which are very soluble in water. These compounds, which are inactive on their own, when introduced into the body, are easily split up freeing the active compound (chloramphenicol). However, these compounds cannot be utilized for combination of other antibiotics, such as tetracycline, with chloramphenicol, as the former dissolve in water in the form of salts (e.g.: hydrochloride, sulfate, etc.) at distinctly acid pH (2–2.5) and at these pH values the chloramphenicol hemi-esters with dicarboxylic acids cannot remain in solution, and precipitate.

The aim of the present invention is the preparation of soluble amino acid ester salts of chloramphenicol which can be combined with the salts of the above-mentioned antibiotics. These esters have the following general formula:

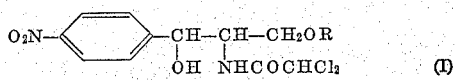

where R=amino acid where the nitrogen is substituted or not by alkyl radicals or by simple or substituted rings.

They may be prepared, for example, according to the following scheme:

(1) Formation of chloramphenicol mono-halogenated esters;
(2) Substitution of the halogen by a substituted amine with alkyl or ring radicals.

In case of preparing non-substituted amino acid esters, the chloramphenicol mono-halogen derivatives are treated with hexamethylenetetramine and then split with acids;

(3) Salification with organic or inorganic acids.

Even these chloramphenicol esters are easily split up when administered parenterally, giving rise to blood levels of active substance high enough to exert a therapeutic effect. The invention is illustrated, but not limited by the following examples:

Example 1

10.2 g. of bromo-acetylbromide in 50 cc. of anhydrous dioxane are added, at room temperature, to a solution of 16.2 g. chloramphenicol and 4.2 cc. pyridine in 65 cc. of anhydrous dioxane. After two hours, the mixture is poured into water and extracted with ethyl acetate. Chloramphenicol bromoacetate is obtained on evaporation of the solvent.

Example 2

40 g. of chloramphenicol monobromo-acetate is dissolved in 100 cc. of ethyl acetate and 100 cc. of benzol and 18.84 g. of morpholine in 50 cc. of benzol are added. The mixture is left at room temperature for 12 hours, filtered and after evaporation of the solvent, the D-threo-1 - p-nitrophenyl-2-dichloroacetamido-3-morpholin - acetate-1,3-propandiol of the formula

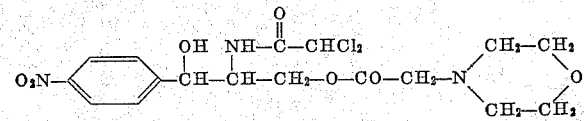

is salified.

We claim:
A member of the group consisting of a D-threo amino acid ester of the following formula:

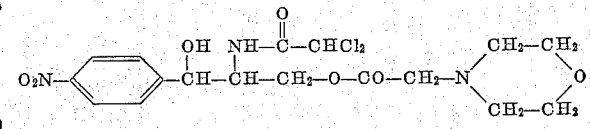

and water-soluble, non-toxic, acid addition salts thereof.

References Cited in the file of this patent
UNITED STATES PATENTS

| | | |
|---|---|---|
| 2,514,376 | Crooks | July 11, 1950 |
| 2,838,552 | Gansau | June 10, 1958 |
| 2,980,674 | Alberti et al. | Apr. 18, 1961 |

OTHER REFERENCES
Idson: Chem. Reviews, vol. 47, No. 3, pp. 524–525 (December 1950).